(12) United States Patent
Tall et al.

(10) Patent No.: US 11,742,940 B2
(45) Date of Patent: Aug. 29, 2023

(54) PASSIVE OPTICAL COMMUNICATION NETWORK AND AIRCRAFT CONTAINING SAID NETWORK

(71) Applicant: LATELEC, Toulouse (FR)

(72) Inventors: Diarra Tall, Toulouse (FR); Yoann Rebiere, Ramonville (FR)

(73) Assignee: LATELEC, Toulouse (FR)

( * ) Notice: Subject to any disclaimer, the term of this patent is extended or adjusted under 35 U.S.C. 154(b) by 0 days.

(21) Appl. No.: 17/779,513

(22) PCT Filed: Dec. 3, 2020

(86) PCT No.: PCT/EP2020/084527
§ 371 (c)(1),
(2) Date: May 24, 2022

(87) PCT Pub. No.: WO2021/110867
PCT Pub. Date: Jun. 10, 2021

(65) Prior Publication Data
US 2023/0013125 A1    Jan. 19, 2023

(30) Foreign Application Priority Data

Dec. 4, 2019 (FR) ........................................ 1913705

(51) Int. Cl.
*H04B 10/032* (2013.01)
*H04B 10/079* (2013.01)

(52) U.S. Cl.
CPC ....... *H04B 10/032* (2013.01); *H04B 10/0791* (2013.01); *H04B 10/0793* (2013.01)

(58) Field of Classification Search
CPC .............. H04B 10/032; H04B 10/0791; H04B 10/0793
See application file for complete search history.

(56) References Cited

U.S. PATENT DOCUMENTS

2007/0280690 A1* 12/2007 Bouda ................. H04J 14/0247
398/68
2014/0050471 A1* 2/2014 Bernasconi ........ H04Q 11/0067
398/2
(Continued)

FOREIGN PATENT DOCUMENTS

CN   101895791 B   5/2013
CN   109450526 A   3/2019

OTHER PUBLICATIONS

Chand et al., "An approach to reducing SWAP and cost for avionics high-speed optical data networks," Military Communications Conference 2008. MILCOM 2008, Nov. 16, 2008, pp. 1-7, IEEE, Piscataway, NJ, USA.

(Continued)

*Primary Examiner* — Mina M Shalaby
(74) *Attorney, Agent, or Firm* — H&I PARTNERS; C. Andrew Im; Jean-Christophe Hamann

(57) ABSTRACT

A passive optical communication network includes two optical line terminals configured respectively to receive a communication signal from information systems and at least two optical network units configured to receive the communication signal. At least two optical switches, one part of which is connected at input to a first terminal via a primary nominal operating path and to the second terminal via a secondary path, and the other part of which is connected at input to a second terminal via a primary nominal operating path and to the first terminal via a secondary path. Each switch being connected at output to at least one optical network unit. A command controller connected to the switches and configured to control the switches such that, when a fault is detected on a primary path, the switch associated with the path is toggled.

6 Claims, 1 Drawing Sheet

(56) References Cited

U.S. PATENT DOCUMENTS

2016/0234582 A1* 8/2016 Ronald ............... H04L 41/0668
2018/0175935 A1   6/2018 Du et al.

OTHER PUBLICATIONS

Nadarajah et al., "Self-protected Ethernet passive optical networks using coarse wavelength division multiplexed transmission," Electronics Letters, Jul. 21, 2005, pp. 866-867, vol. 41, No. 15, IEE Stevenage, GB.

* cited by examiner

PASSIVE OPTICAL COMMUNICATION NETWORK AND AIRCRAFT CONTAINING SAID NETWORK

RELATED APPLICATIONS

This application is a § 371 application of PCT/EP2020/084527 filed Dec. 3, 2020, which claims priority from French Patent Application No. 1913705 filed Dec. 4, 2019, each of which is incorporated herein by reference in its entirety.

TECHNICAL FIELD OF THE INVENTION

The invention relates to the telecommunications field, in particular to the field of optical communication networks, and relates more particularly to a passive optical communication network and an aircraft including it.

A passive optical communication network is known to a person skilled in the art by the English acronym PON, standing for Passive Optical Network.

In particular, the invention finds an advantageous application in the aeronautical field, in particular for equipping an aircraft. Nonetheless, the present invention may find application in any field comprising a communication infrastructure based on the PON technology.

BACKGROUND OF THE INVENTION

In order to interconnect equipment in an aircraft cabin with each other for communication purposes, current aircraft are equipped with numerous and different wirings forming a communication network, the installation and maintenance of which might prove to be complex.

Thus, the wiring, mainly electrical, is generally installed throughout the cabin in areas that are sometimes not easily accessible, generally arranged under the floor or in the ceiling. These wirings should also be perfectly maintained and protected, in particular from attacks that might damage them, such as vibrations, liquid splashes, high temperatures, electromagnetic radiations, etc.

In addition, each piece of equipment distributing data to the cabin uses specific wiring depending on the desired application. A point-to-point connection of the wiring from the avionics cabinets should be performed.

Moreover, when an airline has to proceed with a refit of the cabin of the aircraft, all or part of these wirings should be replaced, inducing maintenance times and considerable aircraft downtime cycles.

Consequently, these wirings have a considerable cost, whether in terms of price, in terms of installation time, maintenance, or else in terms of weight, the weight impacting the mass balance of the aircraft.

In addition, the network as it is currently implemented in aircrafts is not very adaptable to modifications (for example, addition of new equipment to offer new services to passengers). The physical topology of the network is fixed.

Optical communication network architectures, in particular passive ones, are beginning to appear, replacing cables with optical fibres in order to transmit data.

In a passive optical communication network, the same optical line terminal, called OLT standing for "Optical Line Terminal", is connected to several optical network units or terminals, known by the acronym ONU, standing for "Optical Network Unit", connected to end equipment (such as user electronic devices, for example digital tablets). Upstream, the OLT is connected to an information system of the computer server type.

Passive optical communication network architectures have different types of known security architectures, in particular suggested by the International Telecommunications Union, in its G series recommendations, addendum 51, in order to avoid any loss of communication within the optical communication network.

In particular, the security architectures consist in duplicating a portion of the infrastructure of a passive optical communication network, more particularly the OLTs and/or the ONUs and their links within a passive optical communication network. Only one part of the OLTs and ONUs is active during the nominal operation of the passive optical communication network, the second part being on standby and taking over only in the event of a failure of the first one.

Consequently, these security architectures are complex and expensive to implement due to the number of components to be considered in the passive optical communication network. Moreover, these solutions are also energy-intensive.

Hence, these security architectures have drawbacks making these security architectures difficult to adapt to the constraints specific to the aeronautical field.

In addition, in such architectures, the capacity of the passive optical communication network is underused because all of the part of the duplicated infrastructure is not exploited while the passenger needs in terms of bandwidth and performance are increasingly growing, for example to meet entertainment and/or communication needs.

OBJECT OF THE INVENTION

An objective of the present invention is to provide an optimised architecture for securing a passive optical communication network which guarantees robustness to a failure of a component of said network while allowing for a better exploitation of the infrastructure of the network, in particular an optimisation of its bandwidth.

To this end, the invention relates to a passive optical communication network intended for the transmission of data towards user equipment, in a so-called downlink flow direction. Said passive optical communication network comprises:

a first and a second optical line terminal respectively intended to receive the same communication signal, called input communication signal, from distinct information systems which could deliver the same information, each of said first and second line terminals being configured to convert the received communication signal into a same optical signal, of wavelength $\lambda_1$, called input optical signal, at least two switches, the first optical line terminal being coupled, via a first optical fibre, to the at least two switches, and the second line terminal being coupled, via a second optical fibre, to the at least two switches, one part of the switches being connected, at the input to the first optical line terminal via a so-called nominal operation main route, and to the second line terminal via a so-called secondary route, the other part of the switches being connected at the input to the second optical line terminal via a so-called main route of nominal operation and to the first optical line terminal via a so-called secondary route, each switch being connected at the output to at least one optical network unit, at least two optical network units, each optical network unit being configured to reconvert the received input optical signal, of wavelength $\lambda_1$, into an input communication signal, and being intended to transmit it to user equipment, a command-control module connected to the at least two switches, and configured to drive said at least two switches, The passive optical communication network being configured such that, in normal operation, each switch receives on the main route and on the secondary route, the same input optical signal, of wavelength $\lambda_1$, and each switch is configured to send the input optical signal originating from the main route to the at least one optical network unit to which it is connected.

In other words, the passive optical communication network according to the invention is advantageously configured so that, in normal operation, both of the first and second optical line terminals transmit the same input optical signal to the same switches, but only the input optical signal originating from the main route is transmitted by the switches to the optical network units.

The passive optical communication network is further configured so that in the event of a failure breaking the transmission of the input optical signal on the first optical fibre, said command-control module is configured to cause toggling of the switch(es) configured to send the input optical signal, transmitted by the first optical fibre, originating from the main route so that said switch(es) send(s) the input optical signal originating from the secondary route to the at least one optical network unit to which it is or they are connected.

Thus, despite a failure on a main route, the communication between the information systems and the optical network units is preserved.

Hence, the passive optical communication network is robust to failures of the main route and/or optical line terminal. In particular, this robustness is guaranteed thanks to the duplication of said optical line terminals.

Thanks to the switches, each optical line terminal communicates individually with part, for example half, of all optical network units whereas in the architectures of the communication networks of the prior art, the optical line terminal communicates with all of the optical network units.

Thus, in the passive optical communication network according to the invention, in nominal (or normal) operation, the bandwidth of each of the optical line terminals is allocated to only part of the all optical network units, so that from the perspective of the optical network units, this results in an increase in the available bandwidth, in comparison with the architectures of communication networks according to the prior art.

The architecture of the passive optical communication network according to the invention also allows resetting the communications of the network back into service in a very short time interval following a breakdown.

Typically, this time interval corresponds to the toggling of the switch.

For example, following a detected failure, the switches toggle automatically, for example within 2 ms.

Another advantage of the present invention is the optimisation of the exploitation of the resources of the passive optical communication network.

Indeed, both optical line terminals are active and communicate at the same time, each optical network unit communicating with either one of said optical line terminals via a switch.

In particular embodiments, the invention further comply with the following features, implemented separately or in any of their technically feasible combinations.

In some embodiments, the switches are optical switches, of the MEMS type.

In particular embodiments, the passive optical communication network is configured so that, in the event of a failure breaking the transmission of the input optical signal on the second optical fibre, said command-control module is configured to cause toggling of the switch(es) configured to send the input optical signal transmitted by the second optical fibre originating from the main route so that said switch(es) send(s) the input optical signal originating from the secondary route to the at least one optical network unit to which it is or they are connected.

In particular embodiments of the invention, the number of switch(es) connected at the input to the first optical line terminal via the nominal operation main route and to the second optical line terminal via the secondary route, is identical to the number of switch(es) connected at the input to the second optical line terminal via the nominal operation main route and to the first optical line terminal via the secondary route.

In particular embodiments of the invention, the distinct information systems may be two identical servers.

In particular embodiments of the invention, the optical line terminals are connected to communicate with each other so that each optical line terminal could identify any failure of the other optical line terminal.

In particular embodiments of the invention, the command-control module is configured so that, in the event of a failure of an optical line terminal, it causes toggling of all switches to which said terminal is connected via the main route.

In particular embodiments of the invention, each switch is connected to at least two optical network units via a coupler.

Another object of the present invention relates to an aircraft in which is a passive optical communication network is embedded. Said aircraft includes an information system provided with several computer servers operating in pairs, the servers of each pair being respectively associated with one of the optical line terminals of the passive optical communication network.

BRIEF DESCRIPTION OF THE FIGURES

The invention will be better understood upon reading the following description, given as a non-limiting example, and made with reference to the figures which schematically represent.

In these figures, identical reference numerals from one figure to another refer to identical or similar elements.

DESCRIPTION OF THE EMBODIMENTS

Figure 1:
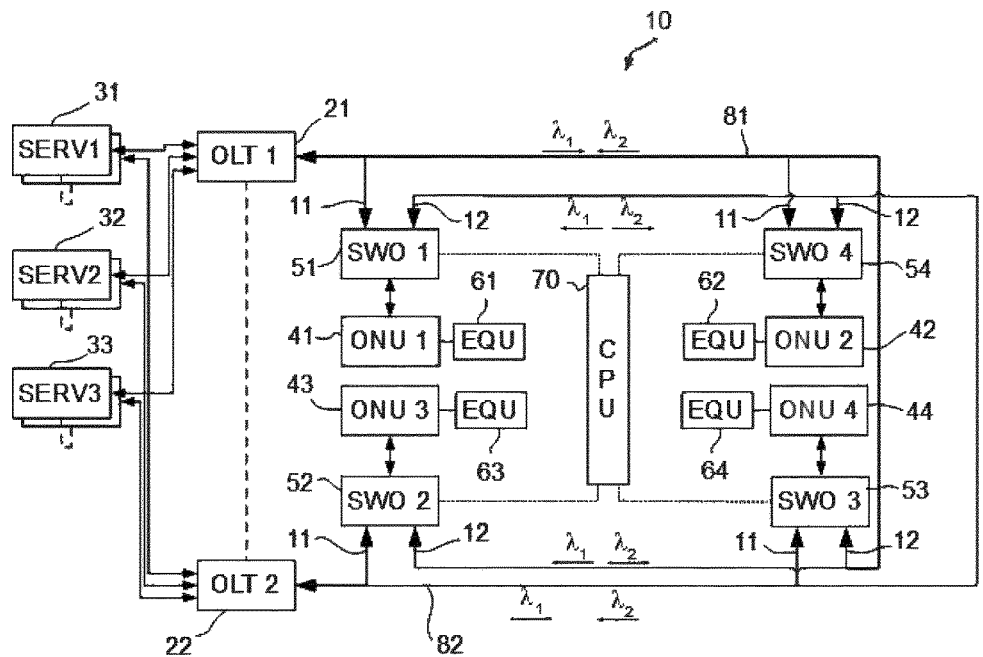
FIG. 1 is an embodiment of a passive optical communication network according to the present invention.

The present invention relates to a passive optical communication network 10 as schematically represented in FIG. 1 in one embodiment.

In general, the passive optical communication network 10 may equip any means of transport, in particular those in the aeronautical, railway or automotive fields, without this restricting the invention.

The present invention preferably concerns the aeronautics field and will be described below in the particular, non-limiting context in which the passive optical communication network 10 is intended to be used in an aircraft.

The passive optical communication network 10 is intended to enable data transmission towards and from user equipment 61, 62, 63, 64.

The user equipment 61, 62, 63, 64 may be of various kinds:
- terminals (fixed screens), for example integrated into passenger seats of the aircraft,
- personal electronic equipment, known by the acronym PED ("personal electronic device"), belonging for example to the passengers of the aircraft,
- flight critical and non-critical technical equipment (pump actuators, temperature or pressure detectors, smoke detectors, etc.).

The passive optical communication network 10 according to the invention includes two optical line terminals 21 and 22, known by the acronym "OLT" standing for "Optical Line Terminal". The two optical line terminals are respectively called first 21 and second 22 optical line terminal. Each optical line terminal 21 and 22 is intended to receive a communication signal, said first communication signal or input communication signal, for example an electrical signal, from information systems 31, 32, 33.

Such information systems 31, 32, 33 may be computer servers, preferably pairs of computer servers. Preferably, each pair of computer servers gathers and manages data relating to a specific service in the aircraft. For example, the information systems are three pairs of computer servers respectively intended for the management of in-flight entertainment, the management of cabin components and the management of communication to outside the aircraft.

Figure 2:
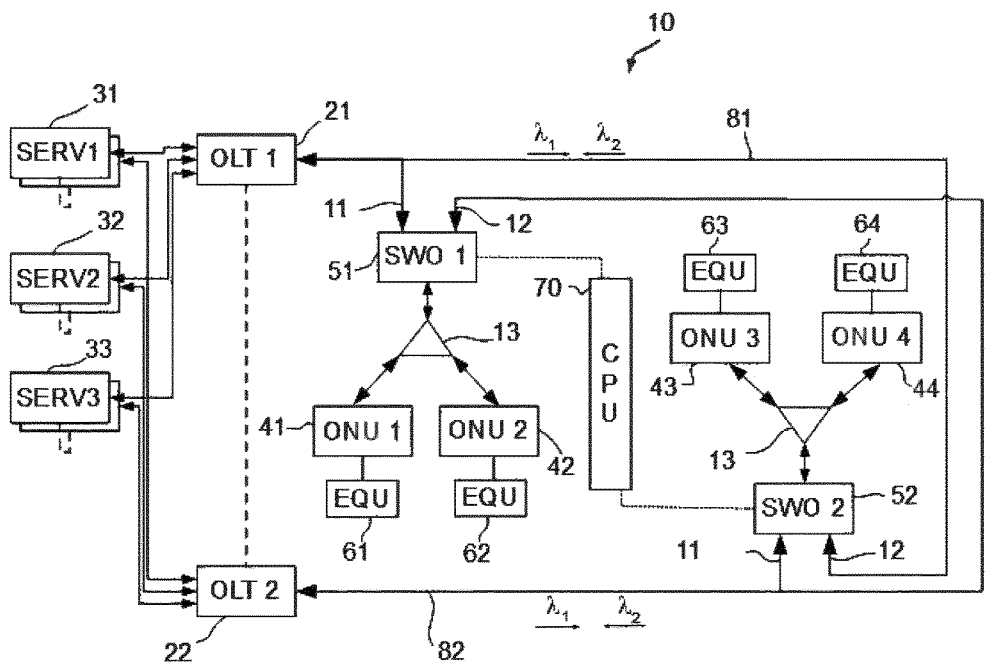
FIG. 2 is a variant of the passive optical communication network of FIG. 1.

Preferably, the optical line terminals 21 and 22 are connected to distinct servers which could deliver the same information. More specifically, as shown in FIGS. 1 and 2, the computer servers of each pair are respectively associated with one of the optical line terminals 21 and 22 and the servers of each pair are connected to each other. Thus, the same information could be transmitted to the two optical line terminals 21 and 22.

Preferably, the optical line terminals 21, 22 are identical.

The passive optical communication network 10 advantageously enables the distribution of downlink and uplink data flows, respectively in and from the user equipment 61, 62, 63, 64.

The downlink flows enable the user equipment to use the data originating from said information systems and the uplink flows allow transferring data to said information systems from said user equipment.

FIGS. 1 and 2 represent a passive optical communication network 10 for data communication in the downlink flow and downlink flow direction.

Each of the optical line terminals 21, 22 is configured, in the downward flow direction, to convert the input communication signal originating from the information systems into the same optical signal, of wavelength $\lambda_1$, called input optical signal.

The passive optical communication network 10 further includes at least two switches 51, 52 and at least two optical network units 41, 43, known by the acronym "ONU", standing for "Optical Network Unit".

Preferably, the switches 51, 52 are identical.

Preferably, the optical network units 41, 43 are identical.

Each optical line terminal 21, 22 is connected to the various user equipment 61, 62, 63, 64 via the switches 51, 52 and the optical network units 41, 43. Preferably, the two optical line terminals 21, 22 are connected to the same user equipment, via the same switches 51, 52 and the same optical network units 41, 43.

The first optical line terminal 21 is coupled to each switch by a first optical fibre 81. Said first optical fibre successively serves the at least two switches 51, 52.

The second optical line terminal 22 is coupled to each switch by a second optical fibre 82. Said second optical fibre successively serves the at least two switches 51, 52.

In one embodiment, the two optical fibres 81, 82 are preferably single-mode. However, nothing excludes the use of multimode optical fibres. Preferably, the optical fibres are identical.

Each switch is coupled to at least one optical network unit. In the embodiment of FIG. 1, each switch is coupled to an optical network unit. In the embodiment of FIG. 2, each switch is coupled to two optical network units.

Each optical network unit is respectively coupled to at least one user equipment 61, 62, 63, 64.

In the embodiment represented in FIG. 1, the passive optical communication network 10 includes four optical network units 41, 42, 43, 44.

In other exemplary embodiments not represented in the figures, the passive optical communication network 10 may include more than four optical network units, indifferently in an even or odd number.

The number of optical network units is selected according to the distribution level of the desired bandwidth.

In the non-limiting example of FIG. 1, the passive optical communication network 10 includes four switches, 51, 52, 53, 54. Preferably, in the present text, the term "switch" refers to an optical switch and is also known by a person skilled in the art as "switch". As shown in FIG. 1, each switch 51 to 54 is connected at the input to the two optical line terminals 21, 22 and at the output to an optical network unit 41 to 44. In this non-limiting embodiment of the invention, the passive optical communication network 10 includes as many switches as optical network units.

Preferably, these switches 51 to 54 are optical switches. They have the advantage of consuming a small amount of energy and that being so only upon toggling thereof as described hereinafter.

More specifically, the two optical line terminals 21 and 22 are connected, respectively by the first optical fibre 81 and the second optical fibre 82, to each switch 51 to 54, either via a main route 11 of nominal operation associated with a main port of one or several switch(es) 51 to 54, or via a secondary route 12 associated with a secondary port of one or several switch(es) 51 to 54.

In the non-limiting embodiment represented in FIG. 1, the switches 51 and 54 are connected at the input to the first optical line terminal 21 via a main route 11 and to a second optical line terminal 22 via a secondary route 12. The switches 52 and 53 are connected at the input to the second optical line terminal 22 via a main route 11 and to the first optical line terminal 21 via a secondary route 12.

The main 11 and secondary 12 routes are made by the optical fibres. In other words, the first optical fibre 81 forms the main access route for the switches 51 and 54 and the secondary access route for the switches 52 and 53. The second optical fibre 82 forms the main access route for the switches 52 and 53 and the secondary access route for the switches 51 and 54.

In the nominal operating mode, i.e. in the absence of failure of the passive optical communication network 10, the communication between each optical line terminal 21 and 22 and respectively the switches 51, 54, and 52, 53, is established over the main route 11. The secondary route 12 is intended to be used in the event of a failure of the communication on the main route 11 as described in more detail hereinafter.

In the passive optical communication network 10 according to the invention, each of the optical line terminals 21 and 22 being connected to a given number of switches via the main route 11, and to a given number of other ones via the secondary route 12, in the nominal operating mode, the load of the optical network units 41 to 44 is distributed between the two optical line terminals 21, 22. Thus, the bandwidth allocated to each optical network unit 41 to 44 is increased.

Preferably, each optical line terminal 21, 22 is connected to the same number of switches via the main routes 11 as via the secondary routes 12, as illustrated in FIG. 1. In other words, in the nominal operating mode, each optical line terminal 21, 22 communicates with the same number of optical network units 41, 42, 43, 44.

Thus, the distribution of the load of the optical network units 41, 42, 43, 44 is identical for the two optical line terminals 21 and 22.

The passive optical communication network 10 includes a command-control module 70. Each switch 51 to 54 is connected to the command-control module 70. Preferably, said command-control module is adapted to detect a failure breaking the transmission of the signal on the main route 11.

Such a failure could occur following a fault in one of the optical line terminals 21 or 22. It could also occur following a break-up in one of the two optical fibres 81, 82. Such a failure results in an absence of transmission of the input communication signal originating from the information systems.

The command-control module 70 may be internal to the optical line terminals 21, 22, and/or to the switches 51 to 54, and/or to the optical network units 41 to 44 or be an independent individual module such as a computer.

The command-control module 70 is configured to drive the switches 51 to 54 so that when a failure is detected on the main route 11 associated with a switch 51, 52, 53 or 54, it causes toggling of said switch in order to send the signal originating from the secondary route 12 associated with this switch to the optical network unit 41, 42, 43 or 44 to which said switch is connected.

More particularly, the command-control module 70 is configured so that, in the event of a failure of a main route 11, and more particularly of the optical fibre forming the main route 11 of one or several switch(es), said command-control module 70 only causes toggling of said switch(es).

Furthermore, the command-control module 70 is configured so that, in the event of a failure of an optical line terminal 21 or 22, it causes toggling of all switch(es) 51, 52, 53 or 54 to which said optical line terminal 21 or 22 is connected via the main route 11. The input communication signal is then transmitted by the other optical line terminal 21 or 22 connected via the secondary route 12 to the switches 51, 52, 53 or 54 having toggled.

The servers of each pair being connected to each other, the same information as that transmitted to the optical network unit 41 to 44 via the main route 11 could also be transmitted via the secondary route 12 of said switches.

Thus, in the event of a communication failure via the main route 11 of one or several connector(s) because of a failure of an optical line terminal 21 or 22 or of an optical fibre, the switch(es) 51 to 54 allow communication to be re-established via the secondary route 12 of said switches connected to the other terminal 21 or 22.

Furthermore, the optical line terminals 21 and 22 are preferably connected to each other so as to be able to communicate together. Hence, each optical line terminal 21, 22 is able to determine when the other optical line terminal 21, 22 is faulty and is capable of resuming the communications of the faulty optical line terminal 21, 22.

Hence, the present invention has the advantage of ensuring communication within the passive optical communication network 10 despite a failure of an optical line terminal 21, 22 and/or a main route 11 of a switch 51 to 54 connected to an optical line terminal 21, 22.

In a variant an example of which is represented in FIG. 2, the passive optical communication network 10 includes two couplers 13 respectively connecting a switch 51, 52 to at least four optical network units 41, 42, 43, 44.

Hence, several optical network units 41 to 44 are connected to the same switch 51 to 54.

Preferably, the coupler is an optical coupler.

In the example of FIG. 2, the coupler is a 1×2 coupler.

The integration of a coupler advantageously allows reducing the number of switches within the passive optical communication network 10.

The passive optical communication network 10 will now be described in detail in the non-limiting embodiment illustrated by FIG. 1, where the switches are four in number, and each switch serves an optical network unit. Of course, without departing from the scope of the invention, it is possible to use less than, or more than, four switches. Similarly, each switch could serve more than one optical network unit.

The role and the operation of the different elements composing the passive optical communication network 10 will be described firstly for a data transmission in the direction of a downlink flow (from the information systems towards the user equipment), as illustrated in FIG. 1, and secondly, for a data transmission in the direction of an uplink flow (from the user equipment towards the information systems).

Direction of the Downlink Flow

Each optical line terminal 21, 22 is arranged and configured to receive a communication signal, called input communication signal, preferably electrical. Each optical line terminal is configured, in the downlink flow direction, to convert the received input communication signal into an optical signal, of wavelength $\lambda_1$, called input optical signal. The input communication signal received by each optical line terminal being preferentially the same, the input optical signal, of wavelength $\lambda_1$, at the output of each optical line terminal 21, 22 is the same.

At the output of the first line terminal 21, the input optical signal, of wavelength $\lambda_1$, is transmitted, via the first optical fibre 81, to each switch 51, 52, 53, 54.

At the output of the second line terminal 21, the input optical signal, of wavelength $\lambda_1$, is transmitted, via the second optical fibre 81, to each switch 51, 52, 53, 54.

The wavelengths of the optical signals entering each optical fibre 81, 82 are preferably selected so as to be identical. Such a selection advantageously allows using identical optical line terminals.

Without limitation, the switches 51 and 54 are connected at the input to the first optical line terminal 21 via the main route and to the second optical line terminal 22 via the secondary route. The switches 52 and 53 are connected at the input to the first optical line terminal 21 via the secondary route and to the second optical line terminal 22 via the main route.

Each switch 51 to 54 is configured to receive, at each of these inputs, the same input optical signal, of wavelength $\lambda_1$, originating from the first optical fibre 81 and from the second optical fibre 82, and to transmit the input optical signal to the optical network unit. In nominal operation, each switch 51 to 54 is configured to send the input optical signal originating from the main route to the optical network unit with which it is associated.

Each optical network unit 41 to 44 is configured to reconvert the input optical signal, of wavelength $\lambda_1$, into an input communication signal. Afterwards, the input communication signal is transmitted to the associated user equipment.

Thus, each user equipment receives the same input communication signal, having transited through either the first or the second optical line terminal.

The passive optical communication network 10 is configured such that:
  In nominal (or normal) operation, each switch 51 to 54 receives on the main route and on the secondary route, the same input optical signal, of wavelength $\lambda_1$, and each switch 51 to 54 is configured to send only the input optical signal originating from the main route to the optical network unit with which it is associated; in other words, the optical signals originating from the first and second optical line terminals are conveyed to each switch, preferably simultaneously, but only the input optical signal originating from the main route is transmitted through the switch,
  In the event of a failure breaking the transmission of the input optical signal on the first optical fibre 81, said command-control module 70 is configured to cause toggling of the switches 51, 54 configured to send the input optical signal, transmitted by the first optical fibre 81, originating from the main route 11 so that said switches send the input optical signal originating from the secondary route 12 (i.e. transmitted via the second optical fibre) to the optical network units 41, 42 to which they are connected.

The passive optical communication network 10 is further configured such that in the event of a failure breaking the transmission of the input optical signal on the second optical fibre 82, said command-control module 70 is configured to cause toggling of the switches 52, 53 configured to send the input optical signal transmitted via the second optical fibre 82, originating from the main route 11, so that said switches send the input optical signal originating from the secondary route 12 (i.e. transmitted via the first optical fibre) to the optical network units 43, 44 to which they are connected.

Thus, in the downward flow direction, the passive optical communication network 10 allows transmitting the same input communication signal, originating from information systems, to user equipment, even upon a failure breaking the transmission of an optical signal on either one of the optical fibres 81, 82.

Direction of the Uplink Flow

A communication signal, called second communication signal or output communication signal, originating from user equipment is transmitted to an optical network unit.

The embodiment will be described, in a non-limiting way, for the user equipment 61. By analogy, the example applies identically to any other equipment.

The optical network unit 41 is configured to convert the output communication signal into an optical signal, of wavelength $\lambda_2$, called output optical signal. Afterwards, the output optical signal is transmitted to a switch 51.

Preferably, the wavelength $\lambda_2$ of the output optical signal is distinct from the wavelength $\lambda_1$ of the input optical signal, in particular when the optical fibres 81, 82 are single-mode optical fibres.

The switch is configured to receive the output optical signal, of wavelength $\lambda_2$, originating from the optical network unit and to transmit said output optical signal to an optical line terminal. In nominal operation, each switch is configured to send the output optical signal via the main route to the optical line terminal. In the example of the switch 51, said switch is configured to send the output optical signal to the first optical line terminal 21, via the first optical fibre 81.

Each optical line terminal is configured, in the uplink flow direction, to reconvert the output optical signal of wavelength $\lambda_2$, into an output communication signal. Afterwards, the output communication signal is transmitted to the information system for which said communication signal is intended.

The passive optical communication network 10 is configured such that:
  in nominal (or normal) operation, each switch 51 to 54 is configured to send the output optical signal (originating from an optical network unit) via the main route to the optical line terminal 21, 22 with which it is associated,
  in the event of a failure breaking the transmission of the output optical signal on the first optical fibre 81, said command-control module 70 is configured to cause toggling of the switches initially configured to send the output optical signal via the main route 11 so that said switches send the output optical signal via the secondary route 12 (i.e. transmit the output optical signal via the second optical fibre) to the second optical line terminal 22.

The passive optical communication network 10 is further configured such that in the event of a failure breaking the transmission of the output optical signal on the second optical fibre 82, said command-control module 70 is configured to cause toggling of the switches initially configured to send the output optical signal via the main route 11, so that said switches send the output optical signal via the secondary route 12 (i.e. transmit the output optical signal via the first optical fibre) to the first optical line terminal 21.

Thus, in the uplink direction, the passive optical communication network 10 allows transmitting the same output communication signal, originating from user equipment, to information systems for which this output communication signal is intended, even upon a failure breaking the transmission of an output optical signal on either one of the optical fibres.

Advantageously, the passive optical communication network 10 according to the invention may be embedded in an aircraft including an information system provided with several computer servers as described before.

More generally, it should be noted that the implementations and embodiments of the invention considered hereinabove have been described as non-limiting examples and that other variants are therefore possible.

In particular, it may be considered to combine the embodiment and the variants of the invention described hereinabove and represented respectively in FIGS. 1 and 2, so that the passive optical communication network 10 includes one or several switch(es) connected to couplers 13 and one or several switch(es) connected directly to optical network units.

The invention claimed is:

1. A passive optical communication network configured to transmit data towards a user equipment, in a downlink flow direction, comprising:
- a first and a second optical line terminals respectively configured to receive a same input communication signal from distinct information systems configured to deliver a same information, each of said first and second optical line terminals being configured to convert a received input communication signal into a same input optical signal, of wavelength $\lambda_1$;
- at least two switches, the first optical line terminal being coupled, via a first optical fiber, to said at least two switches, and the second optical line terminal being coupled, via a second optical fiber, to said at least two switches;
- one part of said at least two switches being connected, at an input to the first optical line terminal via a main route, and to the second optical line terminal via a secondary route, other part of said at least two switches being connected at the input to the second optical line terminal via the main route and to the first optical line terminal via the secondary route;
- at least two optical network units, each switch being connected at an output to at least one optical network unit, each optical network unit being configured to reconvert the received input optical signal, of wavelength $\lambda1$, into the input communication signal, and to transmit the input communication signal to the user equipment;
- a command controller connected to said at least two switches, and configured to drive said at least two switches;
- the passive optical communication network being configured such that:
- in a normal operation, said each switch receives on the main route and on the secondary route, the same input optical signal, of wavelength $\lambda_1$, and said each switch is configured to send the input optical signal originating from the main route to said at least one optical network unit to which said each switch is connected thereto; and
- in an event of a failure breaking transmission of the input optical signal on the first optical fiber, the command controller is configured to cause toggling of a first switch configured to send the input optical signal, transmitted by the first optical fiber, originating from the main route such that the first switch sends the input optical signal originating from the secondary route to said at least one optical network unit to which the first switch is connected thereto.

2. The passive optical communication network of claim 1, wherein in the event of the failure breaking the transmission of the input optical signal on the second optical fiber, the command controller is configured to cause toggling of a second switch configured to send the input optical signal transmitted by the second optical fiber originating from the main route such that the second switch sends the input optical signal originating from the secondary route to said at least one optical network unit to which the second switch is connected thereto.

3. The passive optical communication network of claim 1, wherein a number of the switches connected at the input to the first optical line terminal via the main route and to the second optical line terminal via the secondary route, is identical to a number of the switches connected at the input to the second optical line terminal via the main route and to the first optical line terminal via the secondary route.

4. The passive optical communication network of claim 1, wherein the first and optical line terminals are connected to communicate with each other so that each optical line terminal could identify any failure of the other optical line terminal.

5. The passive optical communication network of claim 1, wherein each switch is connected to said at least two optical network units via a coupler.

6. An aircraft in which is a passive optical communication network of claim 1 is embedded, said aircraft including an information system provided with several computer servers operating in pairs, the servers of each pair being respectively associated with one of the optical line terminals of said passive optical communication network.

* * * * *